United States Patent
Sanders

(10) Patent No.: US 8,031,989 B2
(45) Date of Patent: Oct. 4, 2011

(54) RADIOLOGICAL AND NUCLEAR OPTICAL SENSOR

(75) Inventor: Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 587 days.

(21) Appl. No.: 12/212,451

(22) Filed: Sep. 17, 2008

(65) Prior Publication Data

US 2010/0067844 A1    Mar. 18, 2010

(51) Int. Cl.
G02B 6/00 (2006.01)
G02B 6/34 (2006.01)
G01J 1/04 (2006.01)
G01J 1/42 (2006.01)
G01J 5/08 (2006.01)

(52) U.S. Cl. .......... 385/12; 385/37; 250/227.14
(58) Field of Classification Search .......... 385/12; 250/227.14
See application file for complete search history.

(56) References Cited

U.S. PATENT DOCUMENTS

| | | | |
|---|---|---|---|
| 6,694,067 B1 * | 2/2004 | O'Keefe et al. | 385/12 |
| 7,098,444 B2 | 8/2006 | Beinhocker | |
| 7,382,945 B1 | 6/2008 | Sanders | |
| 2005/0111805 A1 | 5/2005 | Hertz et al. | |

OTHER PUBLICATIONS

European Patent Office, "European Search Report", Jan. 22, 2010, Published in: EP.
Girard et al., "Gamma-Radiation-Induced Attenuation in Photonic Crystal Fibre", "Electronic Letters", Sep. 26, 2002, vol. 28, No. 20.

* cited by examiner

Primary Examiner — Uyen Chau N Le
Assistant Examiner — Kajli Prince
(74) Attorney, Agent, or Firm — Fogg & Powers LLC

(57) ABSTRACT

Optical systems for sensing radiation emissions from radiological and nuclear matter. An example system includes a light source, a light sensor, a processing device in signal communication with the light source and the light sensor, and a fiber optic cable that receives light from the light source and delivers light to the light sensor. The fiber optic cable includes an optical fiber core region surrounded by a cladding region. The optical fiber is a single mode optical fiber having a mode field diameter greater than 25 μm. The optical fiber cladding region includes a plurality of lengthwise holes positioned to provide single mode light propagation properties. The plurality of lengthwise holes have a diameter between 0.1-5 μm.

17 Claims, 2 Drawing Sheets

RADIOLOGICAL AND NUCLEAR OPTICAL SENSOR

BACKGROUND OF THE INVENTION

There is a need for improved Homeland Security Sensing systems that can sense the presence of radiological sources such as those that could be used as dirty bombs (radioactive material to be dispersed by conventional explosives) and the presence of actual nuclear weapons that might be smuggled into the country. Fiber optic sensors have been developed and deployed for a number of sensing applications, and could potentially be useful for sensing radiation sources.

In the past, single mode optical fibers (i.e. conventional fibers) were completely based on index-guiding of light due to doping of glass core to make it have a higher index than the surrounding glass cladding. This produced fibers that typically had a core of 5-10 microns, and a cladding of typically 80-125 microns (FIG. 1), with light mode being confined substantially to the core region. There is typically a plastic jacket around the cladding to protect the glass member, typically of thickness 20-60 microns. One way of employing fiber to make a highly sensitive sensor is to configure the single mode optical fiber in a resonator device. A resonator of this type is highly sensitive to small changes in the loss of the fiber because the light travels through the fiber many times. The issue with using conventional fiber for highly-sensitive radiological sensing is that the core region, where the light is resident, occupies a very small region, namely the core. The fundamental sensitivity of a resonator device is given by the shot noise limit, which improves with the amount of optical power passing through the fiber. However, the optical power in a small-core fiber cannot be arbitrarily increased, since non-linear effects due to high power density ruin the signal to noise. One of these limiting effects is stimulated Brillioun scattering. This effect, for instance, produces instabilities in the signal wave while producing light at another frequency. Thus the primary issue is that small mode-field fibers have low thresholds for Stimulated Brillioun Scattering (SBS), placing optical power limitations on use of these fibers particularly in high signal-to-noise resonator systems. This limits the signal to noise that one can obtain, and thus the minimum resolvable amount radiation.

Optical fiber consists of transparent material such as glass or plastic. Most optical fiber is fused silica and most plastic fiber is polymethylmethacrylate (PMMA). The fiber structure guides light by the process of total internal reflection (TIR). In silica fibers the core is usually established through doping with Germanium. Fibers fall into two basic types, single mode or multimode. In single-mode fibers the core is very small, 5 to 10 microns in diameter, for instance. Multimode fibers have cores of 50 to several thousand microns and very small cladding (in the order of tens of microns). Single-mode fibers have a large cladding (usually more than 50 microns) making the fiber diameter generally 125 microns or more (FIG. 1). The purpose of the large cladding in single-mode fibers is to protect and contain the evanescent field of the single-mode which extends into the cladding for a few microns and can contain more than 10 percent of the optical energy normally thought of as traveling only through the core. Another importance of this larger diameter cladding is so that the fibers can be handled without breaking. With regard to fiber optics used for radiological sensing, radiation from radioactive sources easily penetrates the core and the cladding. However, the dopants inside the core may be chosen to be very sensitive to radiation. These dopants may suffer radiation damage, such as ionization or change atomic state. In turn, this causes loss for light traveling in the fiber, which can be sensed. However, conventional fibers have limitations for signal light power that can be used, and therefore, a larger core is desirable.

Conventional large core fibers (FIG. 2) typically are not single-mode fibers. They propagate a relatively large number of light waves with different spatial distributions, i.e. different spatial modes, possibly in the hundreds. Light traveling in different spatial modes travels at different speeds. Due to unavoidable perturbations, light can and does couple from one mode to another (so-called "mode mixing"). Mode mixing and different light speeds between various modes causes noise and uncertainty in light detection systems and causes pulse spreading in communication systems. For this reason, single-spatial mode (single mode) fibers are used in many communications and sensing systems. While one advantage, of multi-mode fiber is its large core area, the presence of multiple modes and mode mixing renders it unusable in high sensitivity resonator-type sensing devices. What is desirable in the resonator case is a single mode fiber with a large core area.

Resonators have been proposed for use in radiological sensors to circulate light around an optical fiber loop for multiple passes. A periodic series of resonance lineshapes is produced, each having a peak centered about a resonance frequency under normal conditions, and the resonance lineshape has a finesse associated therewith. The frequency-periodicity of frequency separation between resonance frequencies of the same mode is the free spectral range of the resonator. As used herein, the term "finesse" refers to a relationship (e.g., sharpness) based on a ratio of the free-spectral range to the linewidth of an individual resonance lineshape. The linewidth of the resonance lineshape is a frequency width at half of the maximum peak value of the resonance lineshape. The finesse additionally relates to the number of times the light recirculates within the optical loop with reproducibility, and thus is inherently related to the round-trip loss of the resonator. Higher losses generally result in lower finesses. Changes in the finesse, and the amount of light circulating within the resonator can be measured as an indication of changes to the resonator fiber loss, and therefore, to exposure to loss-inducing radiation. The signal to noise of the measurement is determined by the power circulating in the resonator provided there is no significant spurious noise from other modes. It is generally difficult to couple light into a multimode optical fiber and maintain the light in a single spatial mode that reproduces itself for multiple circulations through the resonator. For example, perturbations (e.g., imperfections, geometrical distortions, etc.) along the length of the optical fiber typically decrease the round-trip reproducibility of the single fiber spatial mode within a multi-mode fiber, and thus decrease the finesse. Other spatial mode resonances can also be excited which typically cause errors in the intended measurement. In the latter case, a complex structure of resonances, which may be based on a single stable resonance, may be observed that create instabilities and errors in the measurement. Each spatial mode may be associated with two polarization modes, which doubles the number of resonances in the spectrum.

SUMMARY OF THE INVENTION

This invention provides a small, highly sensitive radiation sensor. This allows for an affordable, very small, yet very sensitive sensing device. It uses light traveling in a radiation sensitive optical fiber. Since it is fiber, additional sensitivity may be provided by using more radiation-sensitive dopants in the core region, and by increasing the dopant concentration. The sensitivity is increased over conventional means of using optical fiber by employing it in a resonator, where light circulates many times, and by increasing the core size of the optical fiber, yet keep it single mode, to increase the cross-section of it for circulating higher power levels. The increased core size allows for more power to be put into the fiber without reaching the stimulated Brillioun threshold.

In one aspect of the invention, the optical fiber is a single mode fiber, whose core has a diameter between 20-100 μm defining an effective core region.

In another aspect of the invention, the optical fiber cladding region includes a plurality of lengthwise holes positioned to provide single mode light propagation properties. The plurality of lengthwise holes have a diameter between 0.1-5 μm.

In still another aspect of the invention, the optical fiber core region includes radiation sensitive dopants such that the light propagating in the single spatial mode experiences greatly increased loss due to exposure to radiation.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
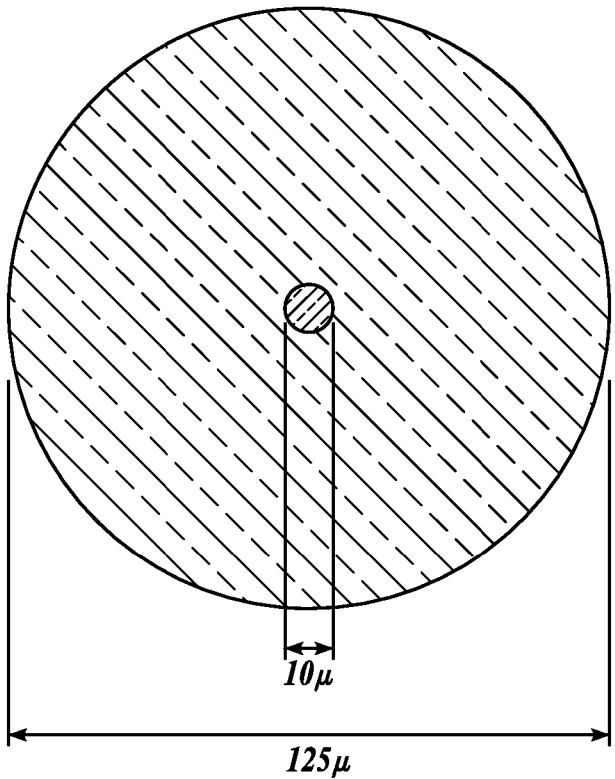
FIGS. 1 and 2 illustrate cross-sectional views of fiber optic cable formed in accordance with embodiments of the prior art.
Figure 2:
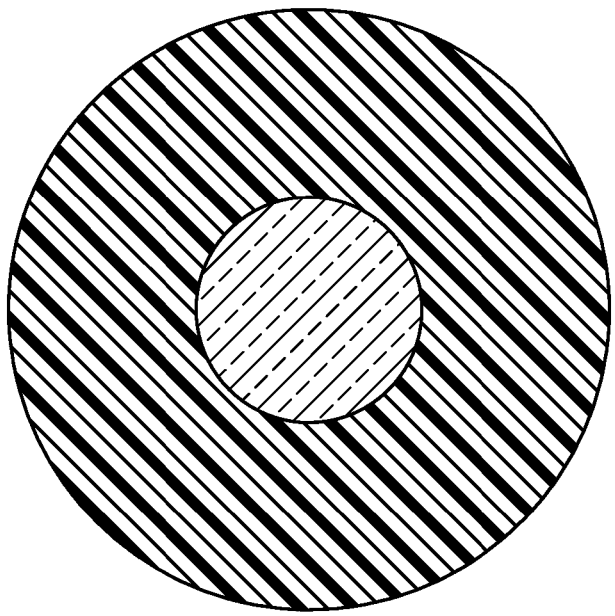
Figure 3:
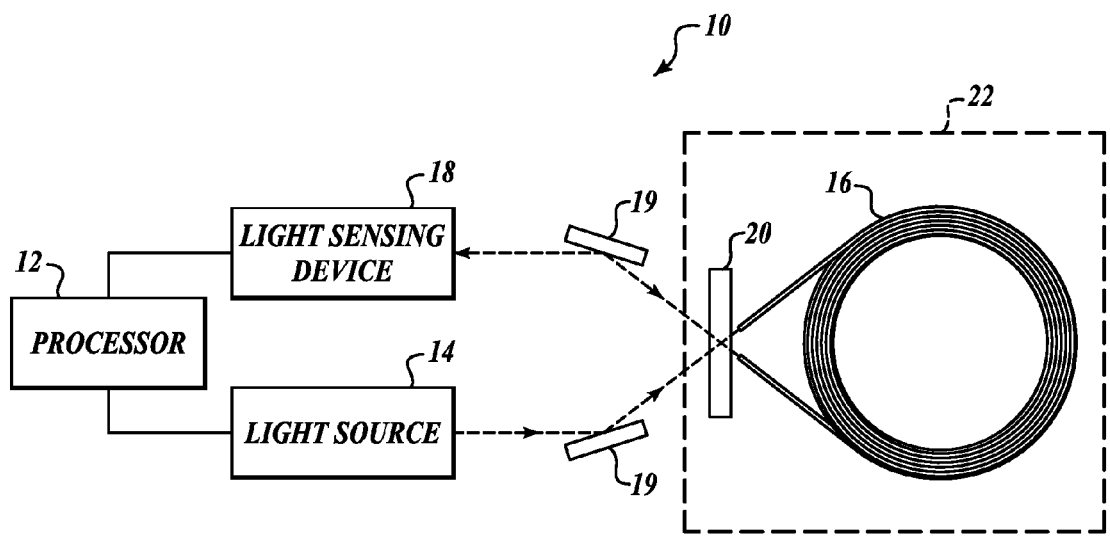
FIG. 3 illustrates a sensor system formed in accordance with an embodiment of the present invention.

FIG. 3 illustrates a radiological/nuclear sensor system 10 formed in accordance with an embodiment of the present invention. The system 10 includes a processor 12, a light source 14, a loop 16 of a cladded optical fiber, a partially transmitting mirror 20, a light sensing device 18, and various optical components 19. The combination of the partially transmitting mirror 20 and the fiber loop 16 form an optical resonator 22. The processor 12 controls the light source 14 to produce a frequency modulated (or "tuned" or "scanned") laser light signal that is sent to the optical resonator 22 and received by the light sensing device 18, via the optical components 19.

Element 20 is shown as a partially transmitting mirror in FIG. 3, but may be a directional coupler or any other device ("recirculator") that facilitates the re-circulation of light in the fiber loop and allows for introducing light into the loop, and extracting a small percentage of light energy out of the loop. In some embodiments, element 20 may be a composite of more than one optical element.

When an input light beam (e.g., from a light source) is supplied to the resonator 22 and the input light beam is tuned through the region of the resonance frequency of the resonator 22 in one direction (e.g., a clockwise or a counter-clockwise direction of the optical fiber coil in the case of a ring resonator), a resonance lineshape is produced in the region of the resonance frequency, which is sensed by the light circulating through the resonator 22. Absent the radiation (gamma ray, neutron, alpha, beta, etc.) to be detected from the environment, the resonance lineshape has a narrow profile (high finesse), corresponding to a low round-trip energy loss of the light circulating in the resonator 22. In this case, a core of the fiber loop 16 is doped with a material that reacts in the presence of radiological/nuclear particles or gamma rays. In the presence of the radiological/nuclear particles or gamma rays, the optical properties, such as attenuation or refractive index of the fiber loop 16, change. In the case of its attenuation changing, the roundtrip loss of the resonator 22 increases causing a reduction in its finesse, or a broadening of its resonance profile. It will also degrade the height or depth of the resonance profile. The sensor processing electronics (the processor 12) determine the change in resonance characteristics such as finesse or free spectral range or peak height as the laser frequency is scanned over the resonance of the resonator 22 and the light is received at the photodetector (the light sensing device 18). The light sensing device 18 receives light outputted from the fiber resonator 22 via the optical components 19 and sends a light sensing signal to the processor 12 for analysis.

In some applications such as for unmanned autonomous vehicles for radiological/nuclear sensing, a high sensitivity, very small sized sensor is quite attractive. It should be noted that this invention has advantages for such applications. For instance, in an exemplary embodiment most of the sensor 10 is constructed on a silicon-based micro-optical bench that integrates electronics (e.g., the processor 12) and optics (for example the light source 14, the light sensing device 18, the optical elements 19 and 20) and provides an efficient and expedient interface between the optics electronics and fiber. The ends of the fiber may be placed in V-grooves and aligned to receive and transmit light to the recirculator 20, located on the optical bench.

Miniature optical components having a feature size of as little as 10 microns, such as the mirror reflectors (the optical components 19), and the recirculator 20, may be mounted on silicon surfaces to eliminate large bulk optics, even though the light wave may be traveling in free space. Some of these optical functions may also be embedded in waveguides residing in the silicon material. In this exemplary embodiment, the light source 14 and related frequency tuning components and the light sensing device 18 may also be mounted on a micro-optical bench. The use of these techniques allows the fabrication of optics in or on a silicon platform and thus integrated with the electronics. The light source itself may be a compound structure with several components that may be mounted or formed on the micro-optical bench. For instance, the light source 14 may be an external cavity laser diode, where the laser diode is placed between two reflective surfaces, which are either formed or placed on the substrate (micro-optical bench). There may also be frequency selective intra-cavity elements formed or placed within the laser cavity to make it a single frequency laser, such as a grating or an etalon. There may also be elements included with the laser source 14 that are mounted or formed external to the laser cavity that are used to shape or collimate the laser beam, such as lenses. It is also noted that the partially transmitting mirror, or the recirculating device 20, may be replaced by a fiber optic coupler or comparable device in some instances.

The fiber loop 16 includes turns of a single mode, flexible and robustly-cladded and coated optical fiber. The fiber loop 16 allows for single-mode light propagation in a glass waveguide structure that is strong enough to be flexible without being fragile. Examples of optical fibers for use as the fiber loop 16 are described below with regards to the photonic crystal fiber of FIG. 4.

Figure 4:
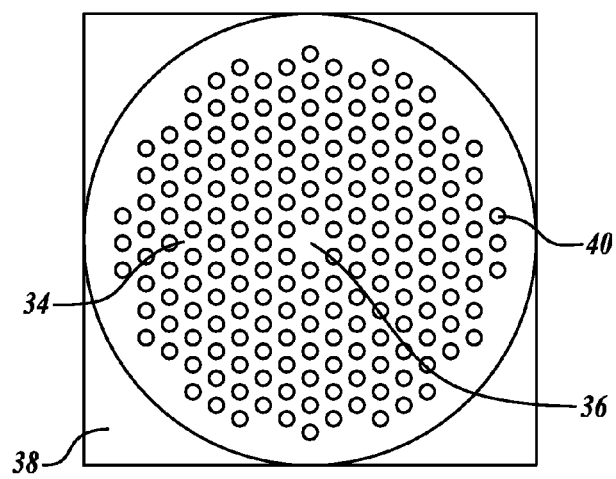
FIG. 4 illustrates a cross-sectional view of a fiber optic cable formed in accordance with embodiments of the present invention.

FIG. 4 illustrates a large mode-field, single-mode fiber optic cable 32 using photonic crystal fiber design such as those offered by Crystal-fibre A/S of Denmark or Newport Corporation of Irvine, Calif. These designs typically use pure silica as the glass throughout the fiber, with air holes interspersed. The air hole pattern is tailored to provide for single mode operation, yet also provide for a very large mode field diameter compared to conventional fiber. The geometry of the fiber may also be tailored to preserve the state of polarization of light, or only conduct one polarization of light. These qualities are beneficial to improving the accuracy of the sensor as well. In this invention, the fiber uses glass that is doped with or contains high concentrations of radiation sensitive constituents such as boron or phosphorus. The cable 32 includes an inner cladding region 34, made of a matrix of glass and plurality of holes 40, that surrounds a solid-glass core region 36. The solid glass core region 36 is doped with, or contains a radiation sensitive substance that is substantially transparent in the absence of radiation. The glass portions of the inner clad region 34 may also be doped with, or contain the radiation-sensitive material. The holes 40 that surround the core region 36 run along the length of the cable 32 and may have various cross-sectional geometries. The fiber optic cable 32 is a single mode fiber. The fiber optic cable 32 may also contain an outer cladding strength member 38 composed of solid glass. The glass core 36 is doped with a material that reacts (i.e., darkens) when exposed to radiological or nuclear particles, thus changing the optical properties of the glass core 36 (i.e., altering the index of refraction and increasing the fiber loss). Example dopants include Boron (B), Germanium (Ge), Ge—P (Phosphorous), or any other matter that ionizes in the presence of beta particles, neutrons, and alpha particles (x-rays or gamma rays). The types and quantities of dopants are selected depending upon what type of radiation one desires to sense.

The resulting fundamental mode of the fiber is a large area single mode whose intensity distribution is circularly symmetric and is peaked in the middle of the core and has tails of its distribution extending into the inner cladding. Using this structure, a diameter of 30 µm or more may be obtained for the light mode diameter by altering the size of the holes 40, and the distances between them, appropriately. In this way higher power light source may be used to achieve more signal to noise, and dynamic range, yet providing low enough power densities to avoid non-linear effects. It should be noted that (while not shown in FIG. 4) other designs of hole location, geometries and shapes are possible.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A sensor comprising:
    an optical resonator comprising an optical fiber, the optical fiber comprising:
        a core region; and
        a cladding region having a cross-sectional geometry configured to confine light in a single spatial mode centered in the core region,
        wherein said optical fiber core region is surrounded by the cladding region, the optical fiber supporting a mode field diameter greater than 25 µm,
        wherein the optical fiber core region includes one or more dopants that cause a change in optical properties of the optical fiber core when exposed to a predefined radiation type.

2. The sensor of claim 1, wherein the optical fiber is a photonic crystal fiber having a cladding region with a plurality of holes.

3. The sensor of claim 1, wherein the cladding region includes a plurality of lengthwise holes positioned to provide single mode light propagation properties.

4. The sensor of claim 3, wherein the plurality of lengthwise holes have a diameter between 0.1-5 µm.

5. The sensor of claim 1, wherein the predefined radiation type is one or more of beta particles, neutrons, or alpha particles, or gamma rays.

6. The sensor of claim 1, wherein said fiber is configured to maintain light of one polarization state.

7. The sensor of claim 6, wherein the fiber is further configured to only propagate light of said one polarization state.

8. A sensor comprising:
    a laser light source;
    a light sensor;
    a processing device in signal communication with the light source and the light sensor; and
    an optical resonator comprising:
        an optical fiber, the optical fiber comprising:
            a core region;
            a cladding region having a cross-sectional geometry configured to confine light in a single spatial mode centered in the core region,
            wherein said optical fiber core region is surrounded by the cladding region, the optical fiber supporting a mode field diameter greater than 25 µm,
            wherein the optical fiber core region includes one or more dopants that cause a change in optical properties of the optical fiber core when exposed to a predefined radiation type; and
        a device for supporting the circulation of light within the optical fiber core region,
        wherein said optical resonator is configured to receive light from the laser light source and to deliver light to the light sensor,
        wherein the optical fiber core region includes one or more dopants that cause a change in optical properties of the optical fiber core region when exposed to a predefined radiation type.

9. The sensor of claim 8, wherein the optical fiber core includes a plurality of lengthwise holes positioned to provide single mode light propagation properties.

10. The sensor of claim 9, wherein the plurality of lengthwise holes have a diameter between 0.1-5 µm.

11. The sensor of claim 8, wherein the predefined radiation type includes at least one of beta particles, neutrons, or alpha particles, or gamma rays.

12. The sensor of claim 8, wherein the laser output of the laser light source is swept across a predefined frequency range, and wherein the processing device determines changes in at least one of the finesse, the free spectral range of the resonator or the resonance peak size as an indication of the presence of radiation based on a signal from the light sensor.

13. The sensor of claim 8, further comprising a common miniature substrate and optical components configured to couple light from said laser light source to said resonator and from said resonator to said light sensor, wherein said laser light source, said light sensor, said optical components are at least one of attached to, mounted on, or formed on said common miniature substrate.

14. The sensor of claim 13, wherein said device for supporting the circulation of light is at least one of attached, formed or mounted on said common miniature substrate.

15. The sensor of claim 13, wherein said processing device is at least one of attached, formed or integrated on said common miniature substrate.

16. The sensor of claim 8, wherein said fiber is configured to maintain light of one polarization state.

17. The sensor of claim 16, wherein the fiber is further configured to only propagate light of said one polarization state.

* * * * *